United States Patent
Hidaka

(10) Patent No.: US 7,233,793 B2
(45) Date of Patent: Jun. 19, 2007

(54) WIRELESS COMMUNICATION TERMINAL AND HANDOFF JUDGMENT METHOD

(75) Inventor: Hiroyuki Hidaka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/538,263

(22) PCT Filed: Dec. 10, 2003

(86) PCT No.: PCT/JP03/15781

§ 371 (c)(1),
(2), (4) Date: Jun. 8, 2005

(87) PCT Pub. No.: WO2004/054136

PCT Pub. Date: Jun. 24, 2004

(65) Prior Publication Data

US 2006/0035638 A1 Feb. 16, 2006

(30) Foreign Application Priority Data

Dec. 10, 2002 (JP) .............................. 2002-357975

(51) Int. Cl.
*H04Q 7/20* (2006.01)
(52) U.S. Cl. .................. 455/436; 455/432.1; 455/442; 455/552.1
(58) Field of Classification Search .. 455/432.1–432.3, 455/436, 437, 439, 442, 550.1, 425, 552.1
See application file for complete search history.

(56) References Cited

U.S. PATENT DOCUMENTS

| | | | |
|---|---|---|---|
| 6,195,551 B1 * | 2/2001 | Kim et al. | 455/436 |
| 6,493,554 B1 * | 12/2002 | Kanerva et al. | 455/437 |
| 6,961,583 B2 * | 11/2005 | Moles et al. | 455/552.1 |
| 2003/0114158 A1 * | 6/2003 | Soderbacka et al. | 455/436 |

FOREIGN PATENT DOCUMENTS

| | | |
|---|---|---|
| JP | 07-030945 | 1/1995 |
| JP | 09-172675 | 6/1997 |
| JP | 11-239375 | 8/1999 |
| JP | 2000-201369 | 7/2000 |
| JP | 2001-128204 | 5/2001 |
| JP | 2001-128210 | 5/2001 |
| JP | 2003-018642 | 1/2003 |

* cited by examiner

*Primary Examiner*—Charles Appiah
*Assistant Examiner*—Jaime Holliday
(74) *Attorney, Agent, or Firm*—Hogan & Hartson LLP

(57) ABSTRACT

A wireless communication terminal, which performs wireless communication with base stations using each of a first communication method and a second communication method and enables to in an idle state with both methods, having a measurement section that measures quality of a signal transmitted from the base station, a handoff determination section that determines handoff in an idle state with the second communication method based on quality of signals transmitted from a connected base station and another base station, and a control section that changes a criterion of the determination of the handoff in the idle state with the second communication method in accordance with a state of the first communication method.

12 Claims, 6 Drawing Sheets

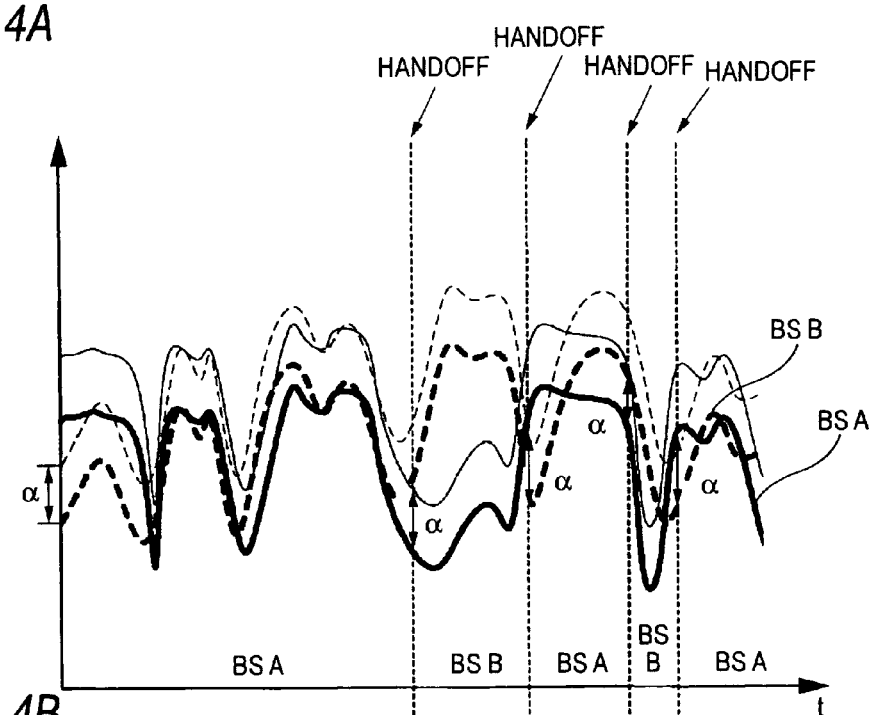
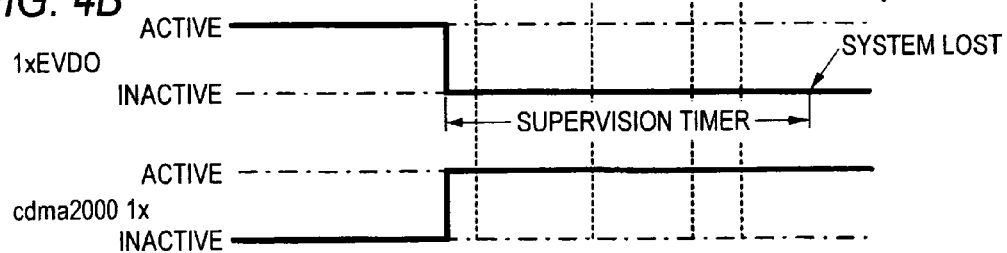

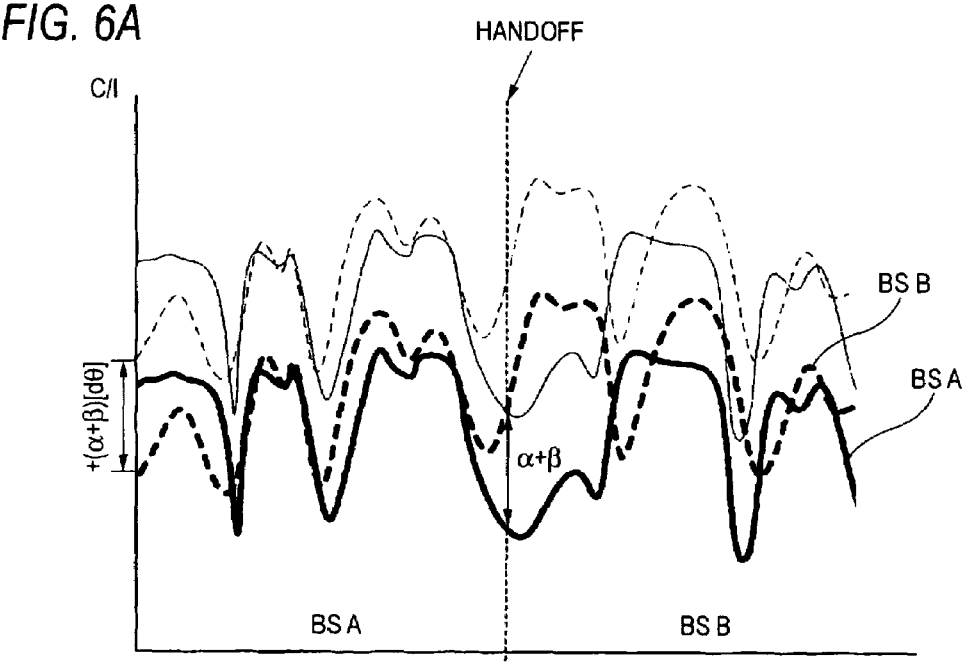
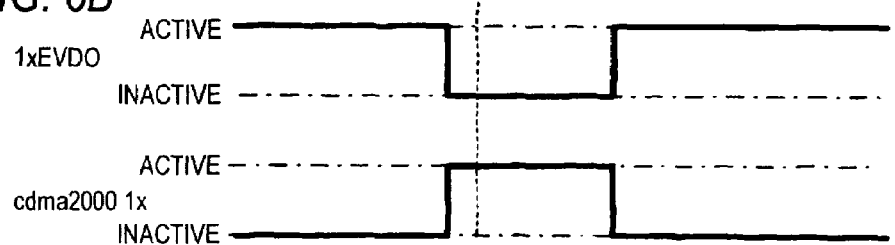

WIRELESS COMMUNICATION TERMINAL AND HANDOFF JUDGMENT METHOD

TECHNICAL FIELD

The invention relates to a wireless communication terminal and a handoff determination method in connection with a hybrid-type wireless communication terminal which performs communication with switching between two communication systems.

BACKGROUND ART

A dual-type wireless communication terminal has been known as a wireless communication terminal capable of performing communication by switching between two communication systems.

Patent Document 1: JP-A-H9-172675

Of the above dual-type wireless communication terminals, a wireless communication terminal, which can measure a wireless communication status of one communication method during communication using another communication method and monitor an incoming call, is especially called a hybrid type.

In relation to the hybrid-type wireless communication terminal, a hybrid-type wireless communication terminal using a cdma2000 1× system which is mainly designed for voice communication and a 1×EVDO system which is specifically designed for data communication suspends the data communication of the 1×EVDO system at predetermined intervals (e.g., 5.12 seconds) and then switches an antenna and a radio section to the cdma2000 1× to perform system monitoring with the cdma2000 1×, in order to monitor an incoming call of the cdma2000 1× during the data communication with the 1×EVDO. When the system monitoring has been completed, the antenna and the radio section are again switched to the 1×EVDO, thereby resuming the data communication with the 1×EVDO. In the case that the wireless communication terminal is located in an area where is in the vicinity of a boundary between service areas by a plurality of base stations as cdma2000 1× system (the case that quantities of signals received from the plurality of base stations (C/I values) contend with each other), the cdma2000 1×, thereby performing the system monitoring with the cdma2000 1×. At this time, when the idle handoff of the cdma2000 1× system has been detected and the idle handoff is continuously detected even after the idle handoff processing, the antenna and the radio section of the wireless communication terminal are still occupied with the cdma2000 1× system. Therefore, after a given period of time has elapsed while the occupation is maintained, the wireless communication terminal as the 1×EVDO system determines that radio wave is lost (see FIG. 4). For this reason, during data communication of the 1×EVDO, the data communication of the 1×EVDO system is disconnected as a result of repetition of the idle handoff in the cdma2000 1× system, although the state of radio wave of the 1×EVDO system is good.

DISCLOSURE OF INVENTION

The invention has been conceived in view of the previously-described drawbacks and aims at providing a wireless communication terminal which prevents unexpected interruption of communication during data communication of with the 1×EVDO system even when idle handoff is frequently repeated in the cdma2000 1× system, as a hybrid communication terminal performing communication by means of switching between two systems; i.e., the cdma2000 1× system and the 1×EVDO system.

A first invention is characterized by a wireless communication terminal, which performs wireless communication using each of a first communication method and a second communication method and enables to be in an idle state with both methods, having: a measurement section that measures quality of a signal transmitted from the base station; a handoff determination section that determines handoff in an idle state with the second communication method based on quality of signals transmitted from a connected base station and another base station; and a control section that changes a criterion of the determination of the handoff in the idle state with the second communication method in accordance with a state of the first communication method.

A second invention according to the first invention is characterized in that the control section sets a first determination threshold value to be used for determining handoff during the idle state with the second communication method when a state of the first communication method is in an idle state, and sets a second determination threshold value to be used for determining handoff during the idle state with the second communication method when the first communication method is in communication.

A third invention according to the second invention is characterized in that the control section sets the second determination threshold value such that frequency of handoff with the second communication method decreases as compared with that of the first determination threshold value.

A fourth invention according to the first through third inventions is characterized in that the first communication method is a 1×EVDO system, and the second communication method is a cdma2000 1× system.

A fifth invention is characterized by a handoff determination method of a wireless communication terminal which performs wireless communication using each of a first communication method and a second communication method and enables to be in an idle state with both methods, the handoff determination method including the steps of: changing a handoff determination criterion of the second communication method in accordance with a status of the first communication method; and determining handoff with the second communication method based on the changed handoff determination criterion.

A sixth invention according to the fifth invention is characterized in that a first determination threshold value to be used for determining handoff during an idle state with the second communication method is set when the first communication method is in an idle state, and a second determination threshold value to be used for determining handoff during the idle state with the second communication method is set when the first communication method is in communication.

A seventh invention according to the sixth invention is characterized in that the second determination threshold value is set such that frequency of handoff with the second communication method decreases as compared with that of the first determination threshold value.

An eighth invention according to the first through seventh inventions is characterized in that the first communication method is a 1×EVDO system, and the second communication method is a cdma2000 1× system.

BRIEF DESCRIPTION OF DRAWINGS

FIGS. 4A and 4B are descriptive views pertaining to determination of conventional idle handoff in the cdma2000 1× system;

FIGS. 6A and 6B are descriptive views pertaining to determination of idle handoff in the cdma2000 1× system of the embodiment.

BEST MODE FOR CARRYING OUT THE INVENTION

An embodiment of the invention will be described hereinbelow.

Figure 1:
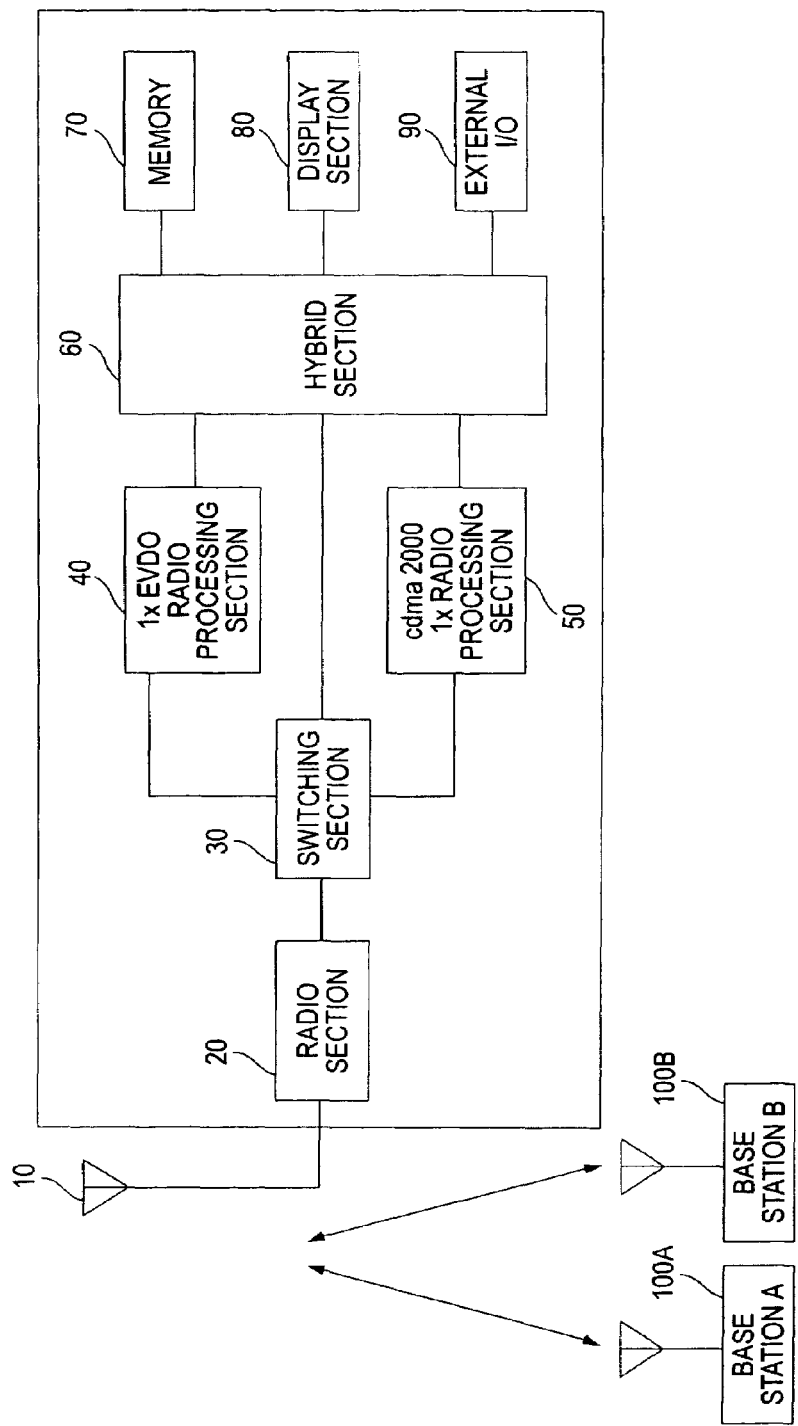
FIG. 1 is a block diagram of a wireless communication terminal according to an embodiment of the invention.

FIG. 1 is a block diagram showing the configuration of a wireless communication terminal according to an embodiment of the invention.

The wireless communication terminal of the embodiment is a wireless communication terminal which can perform communication while moving, by means of selectively switching between a communication system of cdma2000 1× method and a communication system of 1×EVDO (1× Evolution Data Only) method to perform handoff with a base station 100A and a base station 100B.

An antenna 10 converts a high-frequency signal received from a radio section 20 into a radio wave to transmit the radio wave to the base stations 100A, 100B, and receives radio waves output from the base stations 100A, 100B to transmit the radio waves to the radio section 20 as high-frequency signals.

The radio section 20 converts the high-frequency signals transmitted from the antenna 10 into base band signals and sends the base band signals to radio processing sections 40, 50 through a switching section 30. Further, the radio section 20 converts base band signals transmitted from the radio processing sections 40, 50 through the switching section 30 into high-frequency signals to send the high-frequency signals to the antenna 10.

The switching section 30 selectively transmits the base band signals output from the 1×EVDO radio processing section 40 or the cdma2000 1× radio processing section 50 to the radio section 20. Further, the switching section 30 selectively sends the base band signal output from the radio section 20 to the 1×EVDO radio processing section 40 or the cdma2000 1× radio processing section 50.

The 1×EVDO radio processing section 40 converts the data signals transmitted in 1×EVDO format into base band signals, and sends the base band signals to the radio section 20 through the switching section 30. Moreover, the 1×EVDO radio processing section 40 converts base band signals transmitted from the radio section 20 through the switching section 30 into data signals in 1×EVDO format.

Like the 1×EVDO radio processing section 40, the cdma2000 1× radio processing section 50 converts data or audio signals transmitted in cdma2000 1× format into base band signals to send the base band signals to the radio section 20 through the switching section 30. Moreover, the cdma2000 1× radio processing section 50 converts base band signals transmitted from the radio section 20 through the switching section 30 into data or audio signals of in cdma2000 1× format.

A hybrid section 60 is a control section for controlling the two communication systems by means of selectively switching between the two communication systems; that is, the 1×EVDO system and the cdma200 1× system. The hybrid section 60 is connected to the switching section 30, the 1×EVDO radio processing section 40, and the cdma2000 1× radio processing section 50, thereby controlling switching thereof. Particularly, the two communication systems are selectively switched at predetermined time intervals during an idle state, and the wireless communication terminal await incoming calls in both communication systems. The hybrid section 60 is connected to a memory 70, a display section 80, and an external I/O 90.

The memory 70 is a storage section which enables writing or reading of communication data, a program for controlling the wireless communication terminal, or the like.

The display section 80 is a display section which is mainly configured from an LCD display or the like and displays the status of the wireless communication terminal and communication data.

The external I/O 90 is an interface which connects the wireless communication terminal to external equipment such as a personal computer or a PDA, thereby enabling exchange to transmit and receive various data.

Operation of the wireless communication terminal of the present embodiment having the foregoing configuration will be described as follows.

The wireless communication terminal of the embodiment switches the system from the 1×EVDO to the cdma2000 1× at predetermined intervals during data communication of the 1×EVDO system, thereby performing system monitoring of the cdma2000 1× for receiving an incoming call. After the system monitoring has been completed, the wireless communication terminal switches the system from the cdma2000 1× to the 1×EVDO, thereby resuming the data communication.

Figure 2:
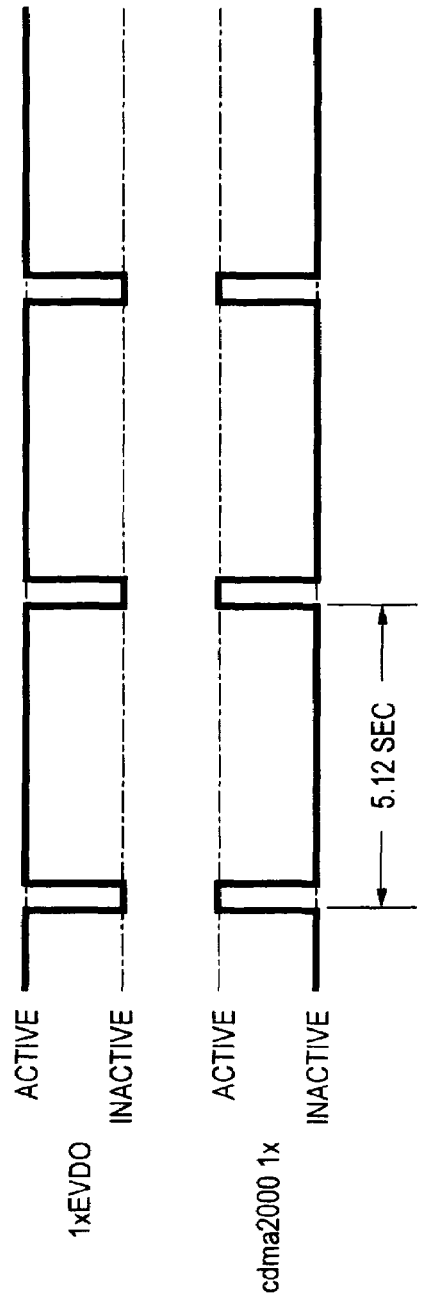
FIG. 2 is a timing chart showing an operating state of the 1×EVDO system and that of the cdma2000 1× system.

FIG. 2 shows a timing chart of the processing. As shown in FIG. 2, when the 1×EVDO system performs data communication and continuously communicates with the base station 100 (Active) (a communicating state), the antenna 10 and the radio section 20 are switched to the cdma2000 1× system at predetermined intervals (5.12 seconds) (the 1×EVDO system is in an idle state (Inactive) at this time), and the cdma2000 1× system performs an incoming call detection processing for receiving a calling message to be sent from the base station.

Coincidentally, the state of the signal transmitted from the base station is monitored. At this time, if the state of a pilot signal transmitted from the base station of the cdma2000 1× system (a C/I value, an RSSI, or the like) is not good, the cdma2000 1× system performs idle handoff.

During the incoming call detection processing of the cdma2000 1× system, the 1×EVDO system is released from the antenna 10 and the radio section 20. The 1×EVDO system cannot detect a radio wave.

At this time, a monitoring timer for radio wave disconnection of the 1×EVDO system operates, thereby measuring a time during which the radio wave is disconnected. After completion of a series of the system monitoring, the cdma2000 1× system releases the antenna 10 and the radio section 20 and enters an idle state (Inactive).

When the antenna 10 and the radio section 20 are released from the cdma2000 1x, the wireless communication terminal again switches to the 1xEVDO system.

Since the 1xEVDO system again detects a radio wave, the monitoring timer of radio wave disconnection is suspended, thereby resuming the data communication.

The data communication of the 1xEVDO system is performed by means of packet communication. Therefore, even when disconnection of a radio wave stemming from switching of the system has been detected, communication can be continuously performed without losing consistency, so long as the communication is resumed within a predetermined period of time.

As mentioned above, when the idle handoff is performed during the incoming call detection processing of the cdma2000 1x system, a return to the 1xEVDO system is delayed for a period corresponding to the time required for the idle handoff.

During a period in which the 1xEVDO system performs communication, the system switching operation is repeatedly performed, thereby detecting an incoming call of the cdma2000 1x system.

Next will be described determination of idle handoff in the wireless communication terminal of the invention. Before the explanation of the determination, conventional determination of idle handoff in the cdma2000 1x system is described.

Figure 3:
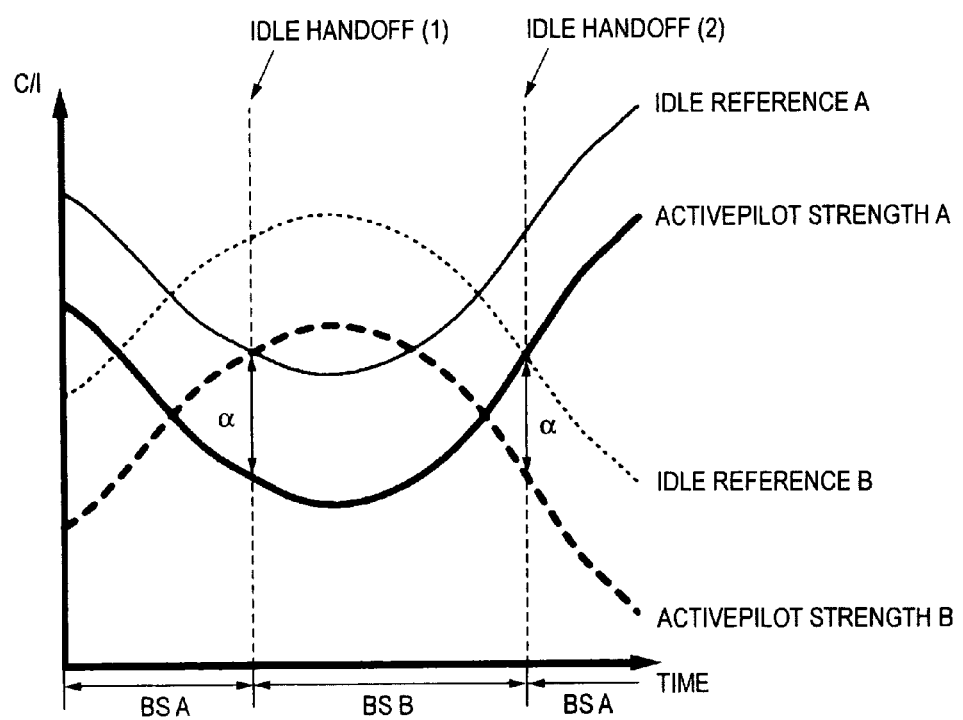
FIG. 3 is a descriptive view pertaining to determination of conventional idle handoff in the cdma2000 1× system.

FIG. 3 is a view showing conventional operation for determining idle handoff (handoff in an idle state) in the cdma2000 1x system.

The vertical axis represents the quality (C/I) of a signal transmitted from the base station, and the horizontal axis represents time. A bold line represents a C/I value (Active Pilot Strength) of the signal transmitted from the base station; (a solid line represents a C/I value of the signal output from the base station A, and a broken line represents a C/I value of the signal output from the base station B); and a fine line represents a value (Idle Reference) determined by adding a threshold value α for idle handoff determination to the C/I value of the signal transmitted from the base station (similarly, a solid line represents a value determined by adding the threshold value α to the C/I value of the signal output from the base station A, and a broken line represents a value determined by adding α to the C/I value of the signal output from the base station B).

The cdma2000 1x system receives radio waves transmitted from the two base stations A (BS A) and B (BS B), thereby calculating C/I values of the signals transmitted from the respective base stations.

In the case that the wireless communication terminal communicates with the base station A, when the C/I value (the bold broken line) of the base station B becomes greater than the C/I value (the bold solid line) of the base station A, and the C/I value of the base station B exceeds a value (the fine solid line) determined by adding the threshold value α for idle handoff determination to the C/I value of the base station A, the wireless communication terminal determines that the idle handoff is necessary and performs idle handoff (1) from the base station A to the base station B.

Next, when the C/I value (the bold solid line) of the base station A becomes greater than the C/I value (the bold broken line) of the base station B and exceeds a value (a fine broken line) determined by adding the threshold value α for idle handoff determination to the C/I value of the base station B, the wireless communication terminal determines that the idle handoff is necessary and performs idle handoff (2) from the base station B to the base station A.

FIGS. 4A and 4B are views showing conventional determination of idle handoff in a state where the idle handoff arises frequently.

In FIG. 4A, in the cdma2000 1x system, a bold solid line represents a C/I value of the signal output from the base station A; a bold broken line represents a C/I value of the signal output from the base station B; a fine solid line represents a value determined by adding the threshold value α for handoff determination to the C/I value of the signal output from the base station A; and a fine broken line represents a value determined by adding the threshold value α for handoff determination to the C/I value of the signal output from the base station B.

FIG. 4B shows the communication state of the 1xEVDO system and the cdma2000 1x system.

As shown in FIG. 4A, when the cdma2000 1x system often performs idle handoff during communication of the 1xEVDO system, that is, when the idle handoff repeatedly arises before the cdma2000 1x system shifts to the idle state (Inactive), the antenna 10 and the radio section 20 of the wireless communication terminal are occupied by the cdma2000 1x system and the wireless communication terminal cannot shift to the idle state.

At this time, the 1xEVDO system measures a period of time during radio wave is interrupted by using the previously-described monitoring timer. When the period of the radio wave interruption state exceeds a predetermined time (Supervision Time), the 1xEVDO system determines that the radio wave from the base station is disconnected, that is, that the wireless communication terminal is in a no service state (System Lost), and performs the processing for completing data communication, thereby terminating the communication.

Therefore, in order to resume the data communication, the user must again operate the wireless communication terminal in order to instruct to resume communication, or the like.

The base station of the 1xEVDO system and the base station of the cdma2000 1x system are not always located in the same area, and cell ranges of the two systems may not be same. For these reasons, even though the 1xEVDO system performs communication with sufficient radio wave quality, the data communication of the 1xEVDO system ends up being disconnected as a result of deterioration of receiving quality of the cdma2000 1x system.

In order to avoid disconnection of communication of the 1xEVDO system, which will be caused by continuous idle handoff due to the state of a radio wave of the cdma2000 1x system, the wireless communication terminal of the embodiment makes an amendment by adding a predetermined correction value to the threshold value of the idle handoff of the cdma2000 1x system when the 1xEVDO system is in data communication. Therefore, the wireless communication terminal changes the threshold to be used for determining whether to perform handoff, thereby reducing the frequency of occurrence of the idle handoff.

Figure 5:
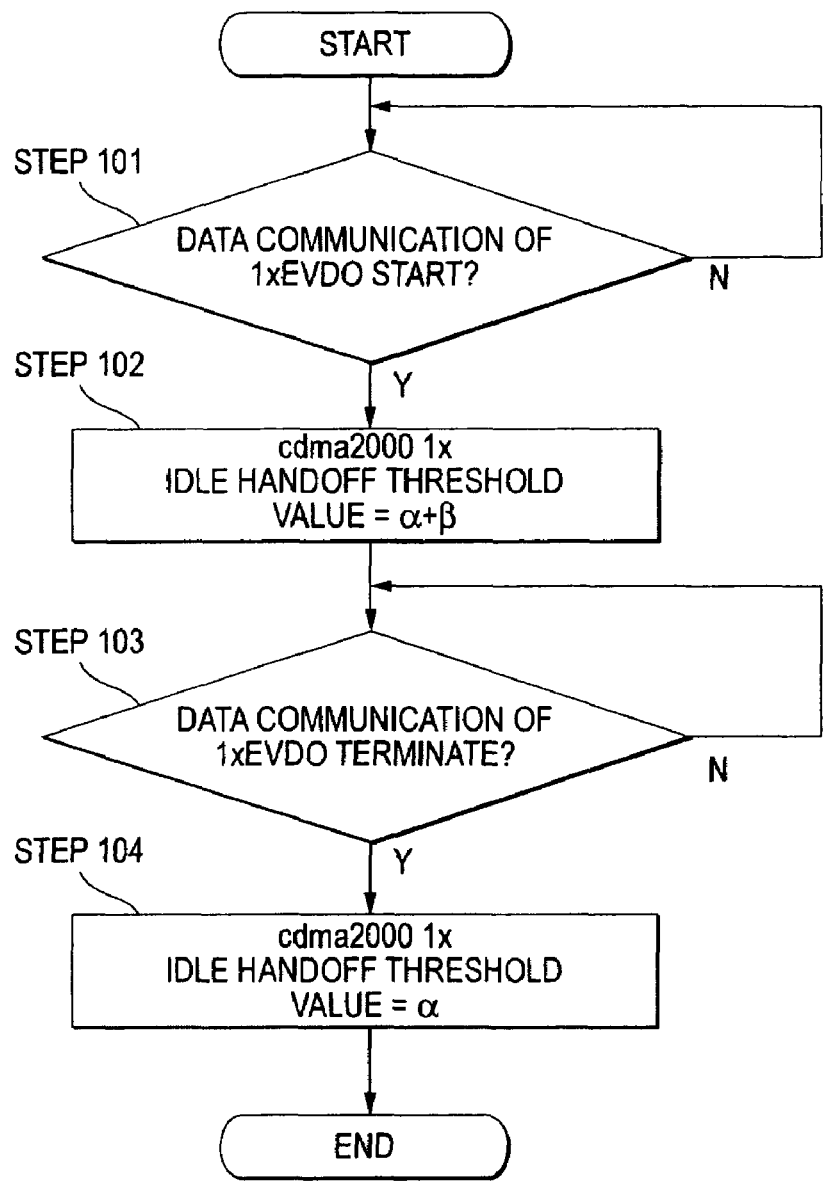
FIG. 5 is a flowchart pertaining to processing of a threshold value of idle handoff during communication of a wireless communication terminal according to an embodiment of the invention.

FIG. 5 is a flowchart showing flow of processing performed during communication of the 1xEVDO system of the wireless communication terminal of the embodiment.

The wireless communication terminal determines whether or not data communication of the 1xEVDO system gets started (step 101). If the data communication has been started, a correction value β is added to the threshold value α employed by the cdma2000 1x system for determining idle handoff (step 102).

Next, the wireless communication terminal determines whether or not the 1xEVDO system has completed the data communication (step 103). If the data communication has been terminated, the threshold value is set back to the threshold value α for ordinary idle handoff determination (step 104).

FIGS. 6A and 6B are views showing an idle handoff determination method employed in the case that the idle handoff determination value is changed through the foregoing processing.

In FIG. 6A, the vertical axis represents the quality (C/I) of a signal transmitted from the base station, and the horizontal axis represents time. A bold line represents a C/I value of the signal transmitted from the base station (a solid line represents a C/I value of the signal output from the base station A, and a broken lines represent a C/I value of the signal output from the base station B); and a fine line represents a value determined by adding the threshold value α for handoff determination and the correction value β to the C/I value of the signal transmitted from the base station (similarly, a solid line represents a value determined by adding α+β to the C/I value of the signal output from the base station A; and a broken line represents a value determined by adding α+β to the C/I value of the signal output from the base station B). FIG. 6B shows the communication state of the 1×EVDO system and the cdma2000 1× system.

In FIG. 6A, as in the case of FIG. 4A, the receiving quality of the base station A and the receiving quality of the base station B contend with each other, and the cdma2000 1× system repeats idle handoff. In the embodiment shown in FIGS. 6A and 6B, the idle handoff arises only once shown by the dotted section as a result of adding of the correction value β to the threshold value α for handoff determination through processing pertaining to step 102 shown in FIG. 5. When the idle handoff processing has completed, the cdma2000 1× system enters the idle state (Inactive) to switch to the 1×EVDO system. Therefore, the processing pertaining to data communication of the 1×EVDO can be resumed, and the data communication is not disconnected.

It is preferable that the correction value β is previously set to an optimum value which decreases the frequency of occurrence of the idle handoff, on the basis of an experiment or a test on a positional relationship between the base station of the cdma2000 1× system and the base station of the 1×EVDO system.

The predetermined correction of the cdma2000 1× system performed during the data communication of the 1×EVDO system is not limited to the correction value β. For example, the correction value may also be a value determined by multiplying a predetermined value. Any correction value may be adopted, so long as the value is used for changing the threshold value (criterion) for determining the idle handoff such that the idle handoff does not frequently arise in the cdma2000 1× system during data communication of the 1×EVDO system.

Although the C/I values are used for determining the idle handoff in the embodiment, an RSSI (received signal intensity) value may also be employed.

In the embodiment of the invention configured above, the wireless communication terminal is a hybrid wireless communication terminal which performs communication with switching between the cdma2000 1× system used for both of audio communication and data communication and the 1×EVDO system used solely for data communication. The wireless communication terminal makes an amendment to a value used for determining whether or not the idle handoff of the cdma2000 1× system is performed during data communication of the 1×EVDO system. As a result, the frequency of idle handoff decreases even in the area where the cdma2000 1× system frequently performs idle handoff. This prevents unexpected interruption of communication, such as termination of data communication, when the interruption state of radio waves has exceeded a predetermined period of time without switching the system to the 1×EVDO system. Consequently, stable data communication can be performed, and a throughput of data communication can be enhanced.

The invention has been described in detail by reference to a specific embodiment. However, it is obvious to the person skilled in the art to make various modifications or corrections on the invention without departing from the sprint and scope of the invention.

The present patent application is based on Japanese Patent Application (Patent Application No. 2002-357975) filed on Dec. 10, 2002, and descriptions of the application are incorporated herein by reference.

INDUSTRIAL APPLICABILITY

According to the invention, the frequency of occurrence of handoff with a second communication method can be reduced during communication with a first communication method. Therefore, the frequency of unexpected disconnection of data communication with the first communication method decreases. Further, stable data communication can be performed, and a throughput of data communication can be enhanced.

The invention claimed is:

1. A wireless communication terminal, which performs wireless communication using each of a first communication system and a second communication system and enables to be in an idle state with both systems, comprising:
    a measurement section that measures quality of a signal transmitted from a base station;
    a handoff determination section that determines handoff in an idle state with the second communication system based on quality of signals transmitted from a connected base station and another base station; and
    a control section that changes a criterion of the determination of the handoff in the idle state with the second communication system in accordance with a state of the first communication system,
    wherein the control section sets a first determination threshold value to be used for determining handoff during the idle state with the second communication system when a state of the first communication system is in an idle state, and sets a second determination threshold value to be used for determining handoff during the idle state with the second communication system when the first communication system is in communication.

2. The wireless communication terminal according to claim 1,
    wherein the control section sets the second determination threshold value such that frequency of handoff with the second communication system decreases as compared with that of the first determination threshold value.

3. The wireless communication terminal according to any one of claims 1 to 2,
    wherein the first communication system is a 1×EVDO system, and the second communication system is a cdma2000 1× system.

4. A handoff determination method of a wireless communication terminal which performs wireless communication using each of a first communication system and a second communication system and enables to be in an idle state with both systems, the handoff determination method comprising the steps of:

changing a handoff determination criterion of the second communication system in accordance with a status of the first communication system; and determining handoff with the second communication system based on the changed handoff determination criterion, wherein a first determination threshold value to be used for determining handoff during an idle state with the second communication system is set when the first communication system is in an idle state, and a second determination threshold value to be used for determining handoff during the idle state with the second communication system is set when the first communication system is in communication.

5. The handoff determination method according to claim 4, wherein the second determination threshold value is set such that frequency of handoff with the second communication system decreases as compared with that of the first determination threshold value.

6. The handoff determination method according to any one of claims 4 to 5, wherein the first communication system is a 1×EVDO system, and the second communication system is a cdma2000 1× system.

7. A wireless communication terminal, which performs wireless communication using each of a first communication method and a second communication method and enables to be in an idle state with both methods, comprising:

a measurement section that measures quality of a signal transmitted from a base station;

a handoff determination section that determines handoff in an idle state with the second communication method based on quality of signals transmitted from a connected base station and another base station; and a control section that changes a criterion of the determination of the handoff in the idle state with the second communication method in accordance with a state of the first communication method, wherein the control section sets a first determination threshold value to be used for determining handoff during the idle state with the second communication method when the first communication method is in an idle state, and sets a second determination threshold value to be used for determining handoff during the idle state with the second communication method when the first communication method is in communication.

8. The wireless communication terminal according to claim 7, wherein the control section sets the second determination threshold value such that frequency of handoff with the second communication method decreases as compared with that of the first determination threshold value.

9. The wireless communication terminal according to any one of claims 7 and 8, wherein the first communication method is a 1×EVDO system, and the second communication method is a cdma2000 1× system.

10. A handoff determination method of a wireless communication terminal which performs wireless communication using each of a first communication method and a second communication method and enables to be in an idle state with both methods, the handoff determination method comprising the steps of:

changing a handoff determination criterion of the second communication method in accordance with a status of the first communication method; and determining handoff with the second communication method based on the changed handoff determination criterion, wherein a first determination threshold value to be used for determining handoff during an idle state with the second communication method is set when the first communication method is in an idle state, and a second determination threshold value to be used for determining handoff during the idle state with the second communication method is set when the first communication method is in communication.

11. The handoff determination method according to claim 10, wherein the second determination threshold value is set such that frequency of handoff with the second communication method decreases as compared with that of the first determination threshold value.

12. The handoff determination method according to any one of claims 10 and 11, wherein the first communication method is a 1×EVDO system, and the second communication method is a cdma2000 1× system.

* * * * *